United States Patent
Tabata et al.

(10) Patent No.: US 9,871,475 B2
(45) Date of Patent: Jan. 16, 2018

(54) PWM MOTOR DRIVE DEVICE

(71) Applicant: Panasonic Intellectual Property Management Co., Ltd., Osaka (JP)

(72) Inventors: Katsuyuki Tabata, Shiga (JP); Tomokazu Furuno, Osaka (JP); Masayoshi Igarashi, Osaka (JP); Shinichi Kuroshima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/442,760

(22) Filed: Feb. 27, 2017

(65) Prior Publication Data

US 2017/0170756 A1 Jun. 15, 2017

Related U.S. Application Data

(63) Continuation of application No. PCT/JP2015/003874, filed on Jul. 31, 2015.

(30) Foreign Application Priority Data

Sep. 12, 2014 (JP) .................. 2014-186435

(51) Int. Cl.
*H02P 6/10* (2006.01)
*H02P 6/08* (2016.01)

(52) U.S. Cl.
CPC .................... *H02P 6/085* (2013.01)

(58) Field of Classification Search
CPC ............... H02P 6/085; H02P 6/10; H02P 6/28
USPC ............................................ 318/599, 400.19
See application file for complete search history.

(56) References Cited

U.S. PATENT DOCUMENTS

| 6,097,127 | A  * | 8/2000 | Rivera ............... H02K 3/28 310/156.12 |
| 6,366,474 | B1 * | 4/2002 | Gucyski ............. G05F 1/70 323/266 |
| 6,759,834 | B2 * | 7/2004 | Wu ................ H02M 7/53803 323/217 |
| 7,548,435 | B2 * | 6/2009 | Mao ................. H02M 3/156 323/266 |
| 7,573,218 | B2 * | 8/2009 | Yu .................... H02P 6/18 318/400.13 |

(Continued)

FOREIGN PATENT DOCUMENTS

| JP | 2006-034086 | 2/2006 |
| JP | 2013-066264 | 4/2013 |
| JP | 2013-066265 | 4/2013 |

OTHER PUBLICATIONS

International Search Report of PCT application No. PCT/JP2015/003874 dated Oct. 13, 2015.

*Primary Examiner* — Rita Leykin
(74) *Attorney, Agent, or Firm* — McDermott Will & Emery LLP

(57) ABSTRACT

A PWM motor drive device includes: a time counter that counts a time of a polarity of a motor phase signal; a register that retains the time; a zone setting circuit that splits the time into arbitrary zones and generates an arbitrary zone set for which a phase of motor current is adjusted; and a zone correction circuit that compares a motor current phase signal indicating the phase of the motor current with the motor phase signal to correct the zone set.

6 Claims, 7 Drawing Sheets

(56) References Cited

U.S. PATENT DOCUMENTS

| | | | | |
|---|---|---|---|---|
| 8,089,232 B2* | 1/2012 | Itagaki | ............... | G11B 19/2054 |
| | | | | 318/400.02 |
| 8,384,324 B2* | 2/2013 | Nakahata | ................... | H02P 6/16 |
| | | | | 318/400.01 |
| 9,118,259 B2* | 8/2015 | Ye | ......................... | H02M 7/493 |
| 9,231,506 B2* | 1/2016 | Hiraki | .................... | H02P 6/142 |
| 9,379,659 B2* | 6/2016 | Mullin | .................... | H02P 31/00 |
| 2005/0275362 A1* | 12/2005 | Yamamoto | .......... | H02P 23/0004 |
| | | | | 318/400.18 |
| 2010/0308760 A1* | 12/2010 | Nakamura | ................ | H02P 6/15 |
| | | | | 318/400.11 |
| 2011/0260669 A1* | 10/2011 | Nakahata | ................... | H02P 7/29 |
| | | | | 318/503 |
| 2013/0069580 A1* | 3/2013 | Ogawa | .................... | H02P 27/08 |
| | | | | 318/504 |
| 2013/0113401 A1* | 5/2013 | Ogawa | .................... | H02P 6/142 |
| | | | | 318/400.19 |

* cited by examiner

PWM MOTOR DRIVE DEVICE

TECHNICAL FIELD

The present disclosure relates to PWM motor drive devices.

BACKGROUND ART

Pulse width modulation (PWM) motor drive devices that aim to supply motor drive current efficiently employ soft switching driving that enables the motor to be driven noiselessly and efficiently by varying the PWM duty ratio to gently change the motor current when the polarities of motor current are switched in accordance with a polarity of the motor.

A conventional technique for gently changing fluctuations of motor current has been disclosed (refer to PTL 1). More specifically, a PWM motor drive device counts a period of a motor phase signal indicating a polarity of a motor and then allocates soft switching zones to the counted period, thereby setting the soft switching zones based on the cycle of the motor. As a result, when the PWM motor drive device switches the polarities of the motor current, an inclination of a slew rate decreases.

CITATION LIST

Patent Literature

PTL 1: Unexamined Japanese Patent Publication No. 2013-66264

SUMMARY OF THE INVENTION

However, the PWM motor drive device disclosed in PTL 1 has the following disadvantage. When the PWM motor drive device switches the motor phases indicating a polarity of the motor, a negative torque may occur due to a delayed or leading phase of the motor current, in which case the efficiency or noiseless property might be degraded.

In view of the above disadvantage, the present disclosure provides a PWM motor drive device that drives a motor noiselessly and efficiently by reducing an occurrence of negative torque in response to the switching between the polarities of the motor.

In order to solve the above disadvantage, a PWM motor drive device according to an aspect of the present disclosure includes a time counter, a register, a zone setting circuit, a zone correction circuit, a frequency dividing circuit, and a control circuit. The time counter counts a time of a polarity of a motor phase signal. The register retains the time. The zone setting circuit splits the time into arbitrary zones and generates an arbitrary zone set for which a phase of motor current is corrected. The zone correction circuit compares a motor current phase signal indicating the phase of the motor current with the motor phase signal to correct the zone set. The frequency dividing circuit generates a clock signal to be used in the time counter and the zone setting circuit. The H-bridge control circuit PWM-drives the motor.

For example, the PWM motor drive device may include a duty ratio allocation circuit that arbitrarily sets a PWM duty ratio.

For example, the PWM motor drive device may include a duty ratio detection circuit and a duty ratio setting circuit. The duty ratio detection circuit detects a duty ratio of a PWM signal. The duty ratio setting circuit arbitrarily sets a PWM duty ratio to each of the zones adjusted by the zone correction circuit, in accordance with the duty ratio detected by the duty ratio detection circuit.

For example, the PWM motor drive device may include a PWM detection circuit and a duty ratio/period setting circuit. The PWM detection circuit detects a duty ratio and period of the PWM signal. The duty ratio/period setting circuit arbitrarily sets a PWM duty ratio and a period to each of the zones adjusted by the zone correction circuit, in accordance with the duty ratio and the period detected by the PWM detection circuit.

For example, the PWM motor drive device may include a zone correction circuit, a duty ratio detection circuit, a weighting circuit, and a variable duty ratio circuit. The zone correction circuit compares the motor current phase signal with the motor phase signal to correct the zone set. The duty ratio detection circuit detects a duty ratio of the PWM signal. The weighting circuit weights the detected duty ratio. The variable duty ratio circuit sets a PWM duty ratio to each of the zones adjusted by the zone correction circuit, in accordance with the duty ratio set by the weighting circuit.

A PWM motor drive device according to the present disclosure can reduce an occurrence of negative torque in response to switching between the polarities of a motor, thereby driving the motor noiselessly and efficiently.

DESCRIPTION OF EMBODIMENTS

A description will be given below of a PWM motor drive device according to exemplary embodiments of the present disclosure, with reference to the accompanying drawings. The exemplary embodiments to be described below represent individual concrete examples of the present disclosure. Therefore, numeric values, dimensions, materials, constituent elements, a layout and connection configuration of the constituent elements, and others described in the exemplary embodiments are exemplary and thus not intended to limit the present disclosure.

First Exemplary Embodiment

Figure 1:
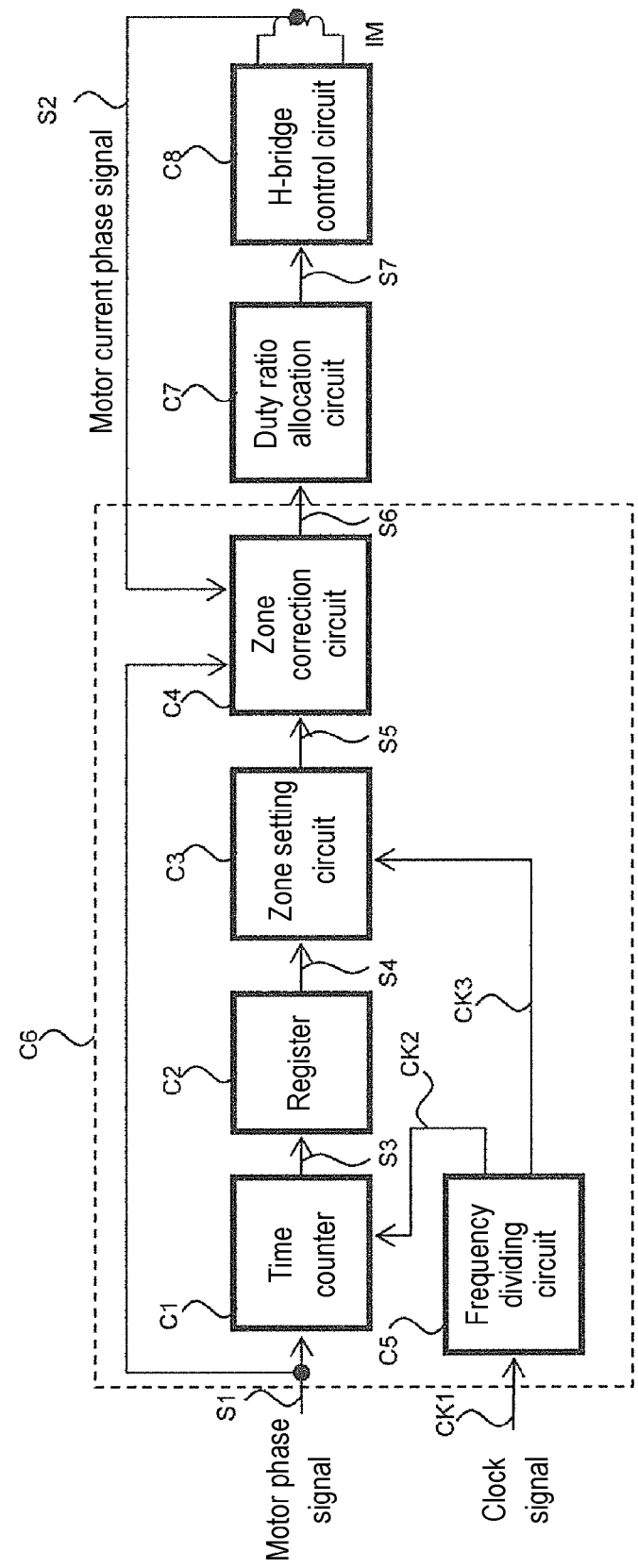
FIG. 1 is a block diagram of a PWM motor drive device according to a first exemplary embodiment.

FIG. 1 is a diagram illustrating a PWM motor drive device according to a first exemplary embodiment. In FIG. 1, motor phase signal S1 indicates a polarity of a motor. Motor current phase signal S2 indicates a polarity of motor current. Time counter C1 counts individual times of the polarities of the motor phase signal S1. Register C2 retains time count value S3 measured by time counter C1. Zone setting circuit C3 splits time count value S3 retained in the register C2 into arbitrary steps, then allocates the split steps to arbitrary zones, and outputs zone setting signal S5. Zone correction circuit C4 compares motor current phase signal S2 with motor phase signal S1 to correct the allocation of the number of steps to the zones set by zone setting circuit C3, thereby generating zone correction signal S6. Frequency dividing circuit C5 subjects clock signal CK1 to frequency dividing, thereby generating clock signals CK2 and CK3 to be used by time counter C1 and zone setting circuit C3. PWM zone setting circuit C6 receives motor phase signal S1, motor current phase signal S2, and clock signal CK1 and outputs zone correction signal S6. PWM zone setting circuit C6 includes time counter C1, register C2, zone setting circuit C3, zone correction circuit C4, and frequency dividing circuit C5. Duty ratio allocation circuit C7 allocates pulse width modulation (PWM) duty ratios to the individual zones corrected by zone correction circuit C4 and then outputs duty ratio allocation signal S7. H-bridge control circuit C8 PWM-drives the motor.

Next, a description will be given of an operation of the PWM motor drive device illustrated in FIG. 1. When a motor rotates, a Hall element detects a magnetized polarity of the rotor. A weak signal that has been detected by the Hall element is binarized by a comparator, and resultant motor phase signal S1 enters time counter C1. Time counter C1 starts a count-up operation using clock signal CK2 generated by frequency dividing circuit C5, in response to a logic inversion of motor phase signal S1. In response to the next logic inversion of motor phase signal S1, register C2 stores time count value S3. Then, time counter C1 is reset and resumes the count-up operation from zero again. In this way, time counter C1 and register C2 repeat an operation of counting a time according to a polarity of the motor and retaining the time.

Figure 2:
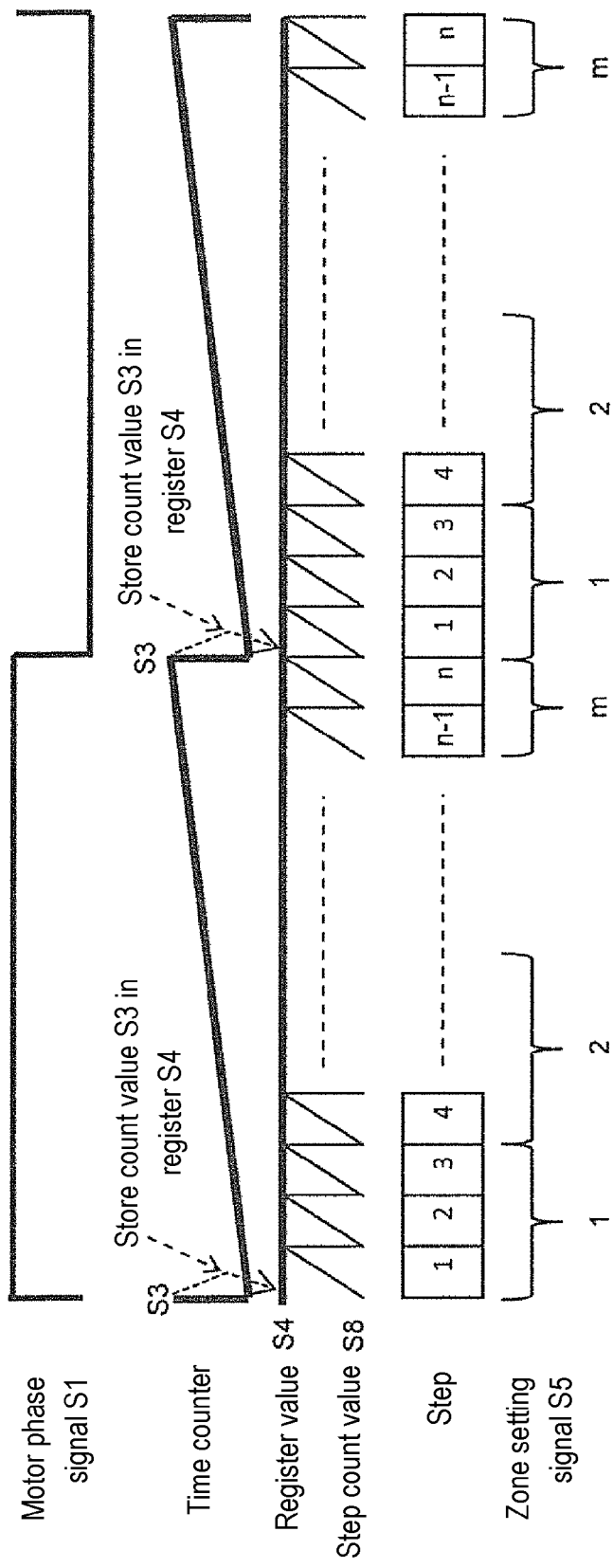
FIG. 2 is a diagram illustrating an operation of a zone setting circuit according to the first exemplary embodiment.

Next, an operation of zone setting circuit C3 will be described with reference to FIG. 2. In FIG. 2, in response to entry of register value S4, zone setting circuit C3 starts a count-up operation using clock signal CK3 whose frequency is n times higher than a frequency of clock signal CK2 used to count time count value S3. When step count value S8 reaches register value S4, zone setting circuit C3 outputs a first step signal, and resumes counting up a step count value from zero. Then, when the step count value reaches register value S4, zone setting circuit C3 outputs a next second step signal. Zone setting circuit C3 repeats this operation until zone setting circuit C3 outputs an N-th step signal, thereby splitting each zone of motor phase signal S1 into first to n-th steps. Then, zone setting circuit C3 allocates the split steps to arbitrary zones and outputs zone setting signal S5.

Zone correction circuit C4 compares motor phase signal S1 with motor current phase signal S2 in any given one of arbitrarily steps that zone setting circuit C3 has arbitrarily split. Then, zone correction circuit C4 corrects the number of steps within each zone which has been set by zone setting circuit C3, so that switching edges of a phase of the motor coincide with switching edges of logic of a phase of the motor current, thereby generating zone correction signal S6.

Duty ratio allocation circuit C7 allocates duty ratios to the respective corrected zones; each duty ratio is used to control an increase, retention, or decrease in the motor current. Then, duty ratio allocation circuit C7 outputs duty ratio allocation signal S7.

H-bridge control circuit C8 PWM-drives a power element in accordance with duty ratio allocation signal S7 set in the above manner, thereby controlling motor current IM.

Figure 3:
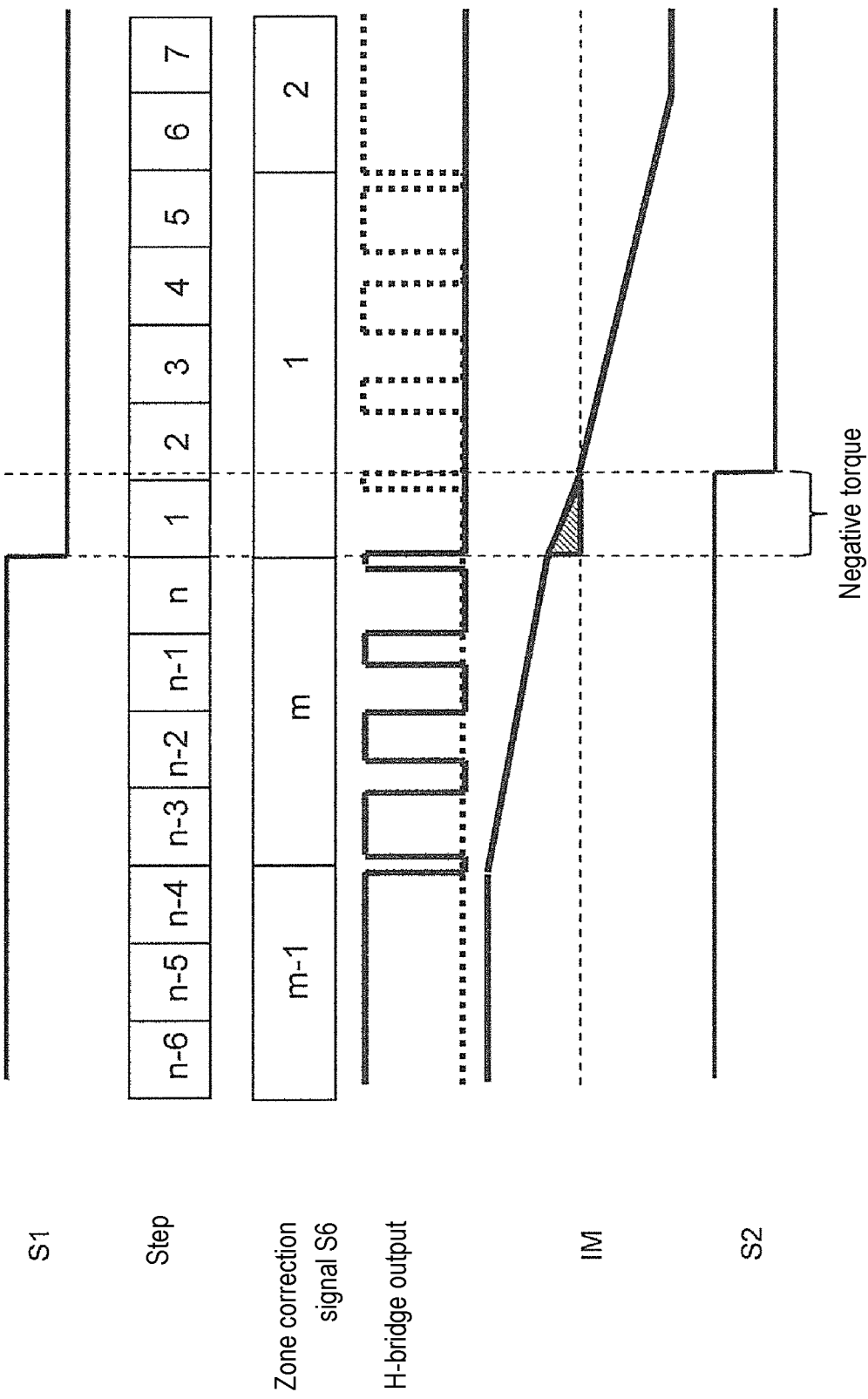
FIG. 3 is a waveform chart illustrating an operation according to the first exemplary embodiment.
Figure 4:
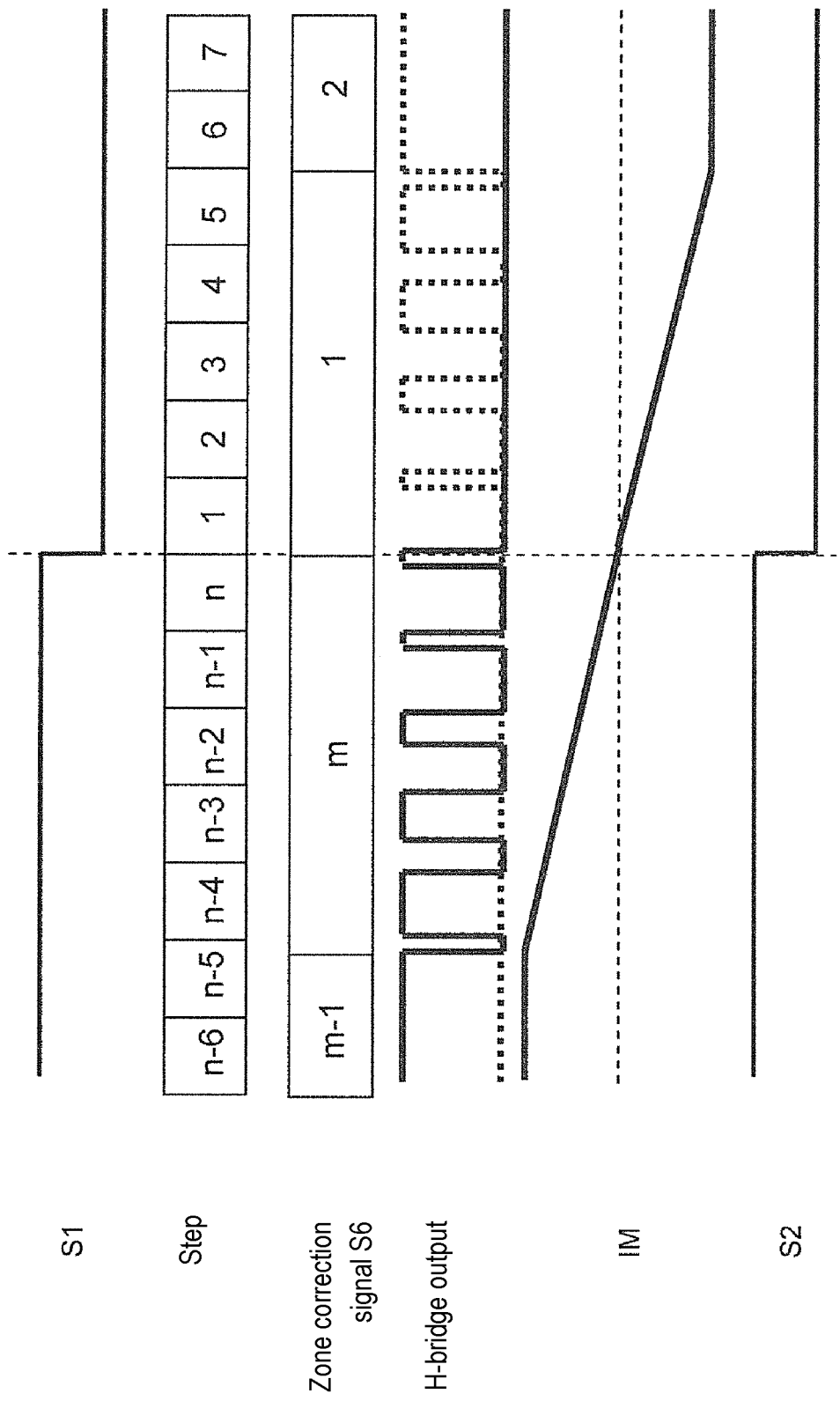
FIG. 4 is a waveform chart illustrating an effect of the first exemplary embodiment.

FIG. 3 is a diagram illustrating an operation of switching the polarities of the motor current before zone correction circuit C4 in the first exemplary embodiment makes the correction. FIG. 4 is a diagram illustrating an operation of switching the polarities of the motor current after zone correction circuit C4 in the first exemplary embodiment has made the correction.

In FIG. 3, H-bridge control circuit C8 is controlled by duty ratio allocation signal S7 set in accordance with zone setting signal S5 set by zone setting circuit C3. Controlling H-bridge control circuit C8 in this manner results in a gentle variation in motor current IM. However, since motor current phase signal S2 is delayed with respect to the switching of motor phase signal S1, negative torque occurs.

In FIG. 4, zone correction circuit C4 increments the number of steps by one within zone m in which the duty ratio of zone correction signal S6 is decreased. As a result, the number of steps within zone m increases from four to five, and thus the delay of the phase of the motor current is corrected. This correction can suppress an occurrence of negative torque which is attributed to a delay of motor current phase signal S2 with respect to switching of motor phase signal S1 in FIG. 3.

Second Exemplary Embodiment

A description will be given below of a configuration and operation of a PWM motor drive device according to a second exemplary embodiment, with reference to the accompanying drawings. The description will be focused on a difference from the foregoing exemplary embodiment (especially, the first exemplary embodiment).

Figure 5:
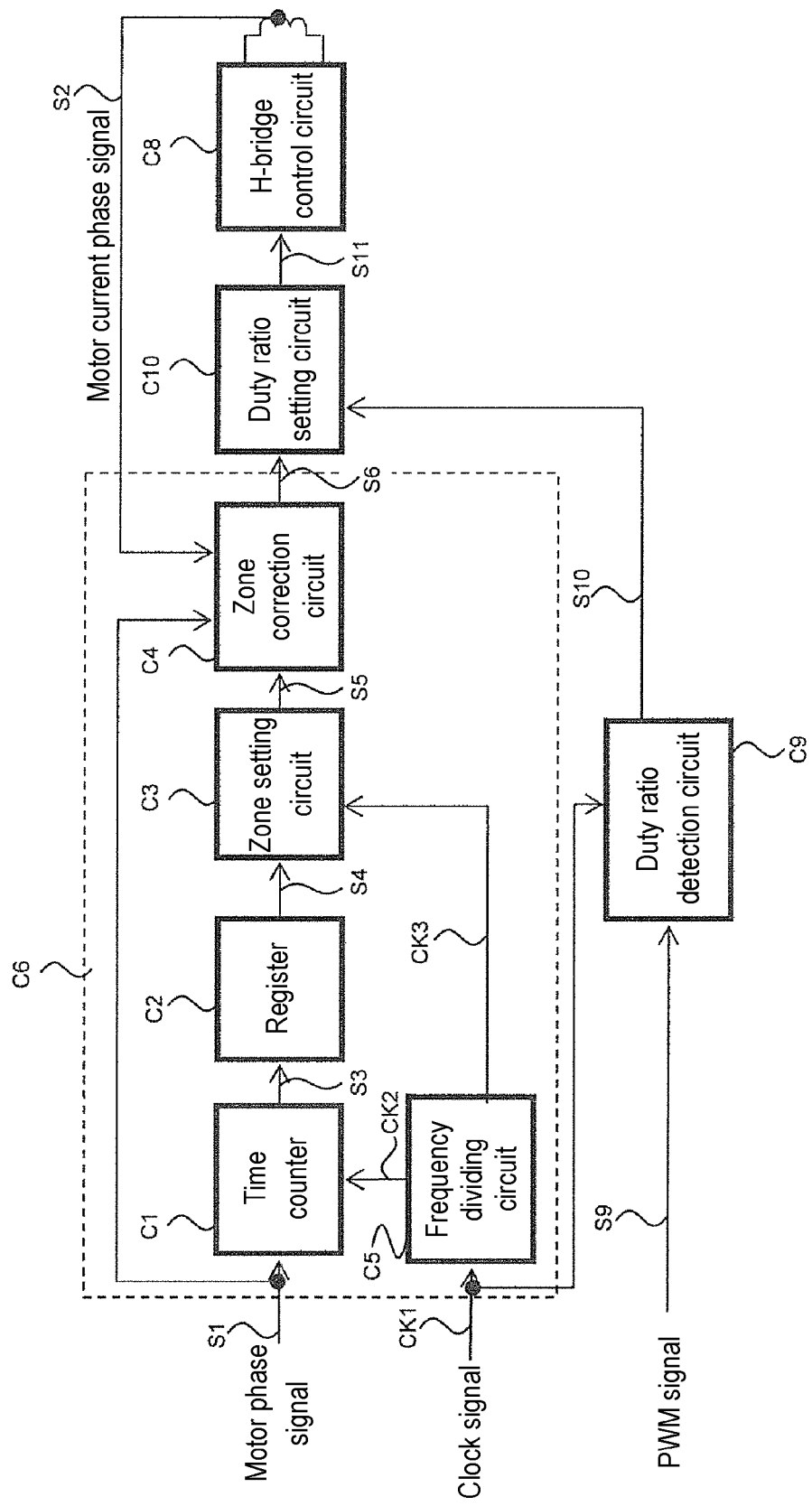
FIG. 5 is a block diagram of a PWM motor drive device according to a second exemplary embodiment.

FIG. 5 is a diagram illustrating a PWM motor drive device according to the second exemplary embodiment. In FIG. 5, C1 to C5, S1 to S6, and CK1 to CK3 are identical to those in FIG. 1. Duty ratio detection circuit C9 detects a duty ratio of PWM signal S9 through clock signal CK1 and outputs duty ratio signal S10. Duty ratio setting circuit C10 receives duty ratio signal S10 and zone correction signal S6 to set an output duty ratio.

Next, a description will be given of an operation of the PWM motor drive device illustrated in FIG. 5. As in the case of the first exemplary embodiment, PWM zone setting circuit C6 receives motor phase signal S1, motor current phase signal S2, and clock signal CK1 and outputs zone correction signal S6. PWM zone setting circuit C6 includes time counter C1, register C2, zone setting circuit C3, zone correction circuit C4, and frequency dividing circuit C5.

Duty ratio detection circuit C9 detects a duty ratio of PWM signal S9 through clock signal CK1 and outputs duty ratio signal S10.

Duty ratio setting circuit C10 outputs duty ratio setting signal S11 allocated such that the maximum value of the PWM duty ratio used to control an increase, retention, or decrease in the motor current for each corrected zone becomes equal to duty ratio signal S10.

H-bridge control circuit C8 PWM-drives a power element in accordance with the duty ratio setting signal S11 set in the above manner, thereby controlling motor current IM.

In the case where the PWM motor drive device attempts to vary a rotational frequency of a motor, for example, when the motor runs at a high rotational frequency, motor current phase signal S2 may be changed so as to be delayed with respect to motor phase signal S1 (phase delay). When the motor runs at a low rotational frequency, motor current phase signal S2 may be changed so as to lead motor phase signal S1 (phase lead). In order to solve this disadvantage, the configuration in the second exemplary embodiment is employed, which allows a duty ratio to be varied based on PWM signal S9. This can automatically correct a phase difference, such as a phase delay or lead as described above.

Third Exemplary Embodiment

A description will be given below of a configuration and operation of a PWM motor drive device according to a third exemplary embodiment with reference to the accompanying drawings. The description will be focused on a difference from the foregoing exemplary embodiments (especially, the first exemplary embodiment).

Figure 6:
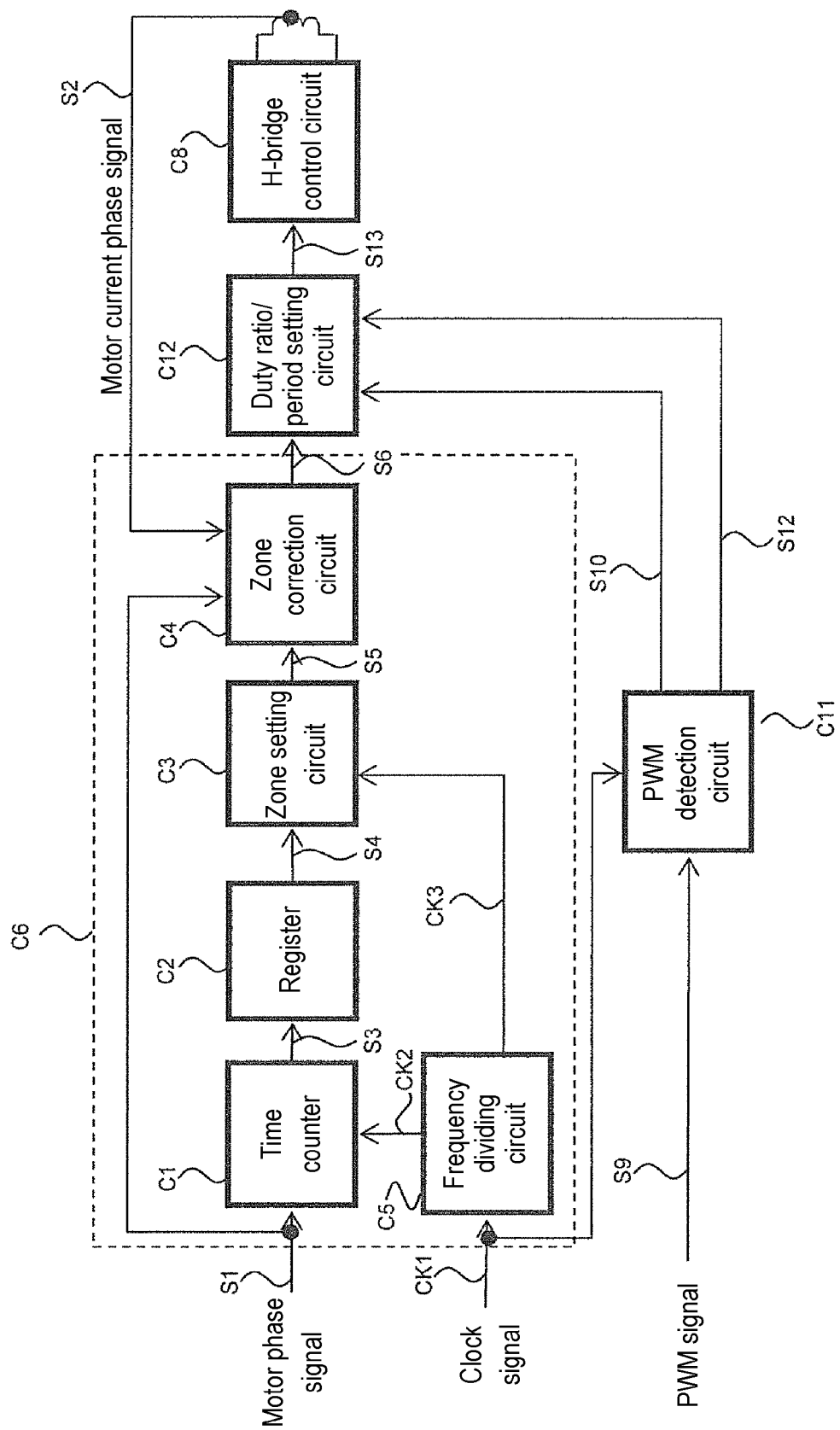
FIG. 6 is a block diagram of a PWM motor drive device according to a third exemplary embodiment.

FIG. 6 is a diagram illustrating a PWM motor drive device according to the third exemplary embodiment. In FIG. 6, C1 to C6, S1 to S6, and CK1 to CK3 are identical to those in FIG. 1. PWM detection circuit C11 detects a duty ratio and period of PWM signal S9 by using clock signal CK1 and outputs duty ratio signal S10 and periodic signal S12. Duty ratio/period setting circuit C12 receives duty ratio signal S10 and periodic signal S12, and zone correction signal S6 to set a PWM output duty ratio and a period.

Next, the operation in FIG. 6 will be described. As in the case of the first exemplary embodiment, PWM zone setting circuit C6 receives motor phase signal S1, motor current phase signal S2, and clock signal CK1 and outputs zone correction signal S6. PWM zone setting circuit C6 includes time counter C1, register C2, zone setting circuit C3, zone correction circuit C4, and frequency dividing circuit C5. PWM detection circuit C11 detects a duty ratio and period of PWM signal S9 by using clock signal CK1 to output duty ratio signal S10 and periodic signal S12.

Duty ratio/period setting circuit C12 outputs duty ratio/period setting signal S13 allocated such that the maximum value of the PWM duty ratio used to control an increase, retention, or decrease in the motor current for each corrected zone becomes equal to duty ratio signal S10 and such that the PWM period becomes equal to the input period of periodic signal S12.

H-bridge control circuit C8 PWM-drives a power element in accordance with duty ratio/period setting signal S13 set in the above manner, thereby controlling motor current IM.

In the case where the PWM motor drive device attempts to vary a rotational frequency of a motor, for example, when the motor runs at a high a rotational frequency, motor current phase signal S2 may be changed so as to be delayed with respect to motor phase signal S1 (phase delay). When the motor runs at a low rotational frequency, motor current phase signal S2 may be changed so as to lead motor phase signal S1 (phase lead). If a period of PWM is fixed as a constant period, the number of times that PWM detection circuit C11 detects a duty ratio for each zone (one period) set by zone setting circuit C3 may be smaller when the motor runs at a high rotational frequency than when the motor runs at a low rotational frequency. These disadvantages might make it difficult to switch motor currents precisely. Employing the configuration in the third exemplary embodiment in order to solve these disadvantages allows the duty ratio and the period to be varied based on PWM signal S9. It is thus possible to automatically correct a phase difference, such as a phase delay or lead as described above. Moreover, changing a period enables the number of times that PWM detection circuit C11 detects a duty ratio to be arbitrarily set in accordance with each zone and independently of a varying rotational frequency of a motor. This can switch motor currents optimally and smoothly in accordance with individual rotational frequencies. Consequently, it is possible to achieve a low-noise motor and highly efficient PWM driving.

Fourth Exemplary Embodiment

A description will be given below of a configuration and operation of a PWM motor drive device according to a fourth exemplary embodiment, with reference to the accompanying drawings. The description will be focused on a difference from the foregoing exemplary embodiments (especially, the first exemplary embodiment).

Figure 7:
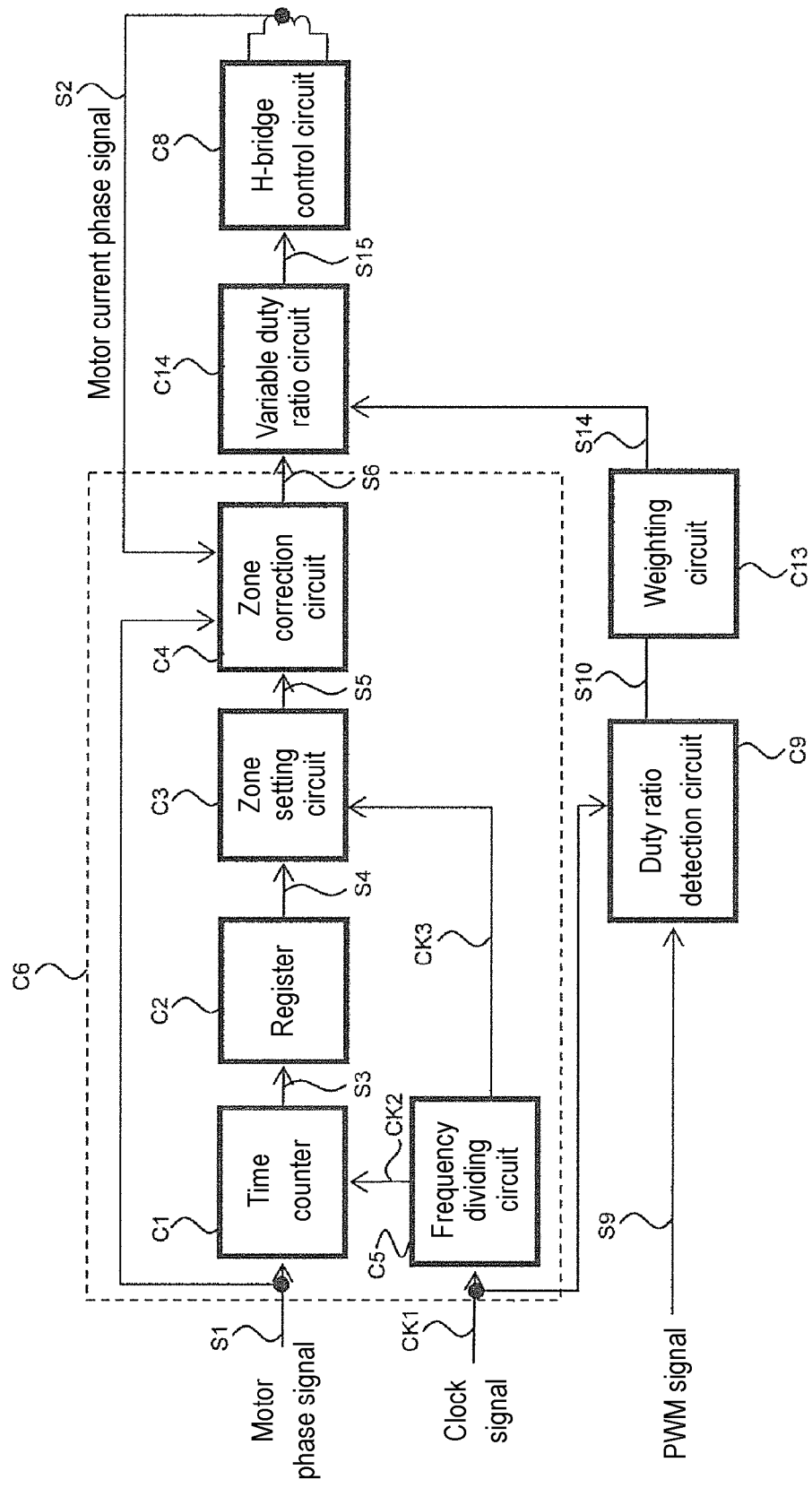
FIG. 7 is a block diagram of a PWM motor drive device according to the third exemplary embodiment.

FIG. 7 is a diagram illustrating a PWM motor drive device according to a fourth exemplary embodiment. In FIG. 7, C1 to C6, S1 to S6, and CK1 to CK3 are identical to those in FIGS. 1. C9 and S9 to S10 are identical to those in FIG. 3. Weighting circuit C13 adds a weight to duty ratio signal S10 that has been detected by duty ratio detection circuit C9 and outputs weighting signal S14. Variable duty ratio circuit C14 receives weighting signal S14 and zone correction signal S6 and sets an output duty ratio.

Next, an operation in FIG. 7 will be described. As in the case of the first exemplary embodiment, PWM zone setting circuit C6 receives motor phase signal S1, motor current phase signal S2, and clock signal CK1 and outputs zone correction signal S6. PWM zone setting circuit C6 includes time counter C1, register C2, zone setting circuit C3, zone correction circuit C4, and frequency dividing circuit C5. Duty ratio detection circuit C9 detects a duty ratio of PWM signal S9 by using clock signal CK1 and outputs duty ratio signal S10.

Weighting circuit C13 adds a variable weight to duty ratio signal S10 and outputs weighting signal S14. Variable duty ratio circuit C14 outputs weighted duty ratio setting signal S15 allocated such that the maximum value of the PWM duty ratio used to control an increase, retention, or decrease in the motor current for each corrected zone becomes equal to weighting signal S14.

H-bridge control circuit C8 PWM-drives a power element in accordance with weighted duty ratio setting signal S15 set in the above manner, thereby controlling motor current IM.

Employing the above configuration in the fourth exemplary embodiment makes it possible to set the PWM duty ratio to any given value, based on PWM signal S9. When a rotational frequency is higher than an input duty ratio, for example, weighting circuit C13 can adjust the rotational frequency to a smaller value by adding a lighter weight to the duty ratio. When a rotational frequency is lower than an input duty ratio, weighting circuit C13 can adjust the rotational frequency to a higher value by adding a heavier weight to the duty ratio. This can improve the linearity of setting of a rotational frequency of a motor in relation to an input duty ratio. Consequently, it is possible to control a rotational frequency of a motor with stability, thereby achieving a low-noise motor and highly efficient PWM driving.

CONCLUSION

The PWM motor drive device according to the embodiments (first to fourth exemplary embodiments) that have been described with reference to the drawings automatically adjusts a phase of motor current in accordance with a phase of a motor which indicates a polarity of the motor. In addition, the PWM motor drive device gently changes fluctuations of the motor current when switching the polarities of the motor current. This can reduce an occurrence of negative torque in response to switching between the polarities of the motor, thereby driving the motor noiselessly and efficiently.

The PWM motor drive device according to the embodiments of the present disclosure has been described; however, the present disclosure is not limited to these embodiments.

For example, one or more processors included in the PWM motor drive device according to the above embodiments may be implemented using at least one large scale integrated circuit (LSI) that is an integrated circuit (IC). The processors may be packed into respective chips, or one or more of the processors may be packed into a single chip.

Alternatively, an IC is not limited to an LSI, and the one or more processors included in the PWM motor drive device may be implemented using a dedicated circuit or a general-purpose processor. A field programmable gate array (FPGA) that is programmable after an LSI has been manufactured or a reconfigurable processor that can reconfigure connections and setting of circuit cells inside an LSI may be used.

Constituent elements in the foregoing embodiments may be configured with dedicated hardware or implemented by executing a software program suitable for the constituent elements. The individual constituent elements may be implemented by a program execution unit, such as a central processing unit (CPU) or processor, reading and executing a software program stored in a hard disk, semiconductor memory, or other recording medium.

The division of each block diagram into the functional blocks is exemplary. Alternatively, a plurality of functional blocks may be implemented using a single functional block, one functional block may be divided into a plurality of functional blocks, or a part of the functions may be transferred to another functional block. A single hardware or software unit may process a plurality of functional blocks having similar functions in a parallel or time sharing manner.

The PWM motor drive device according to one or more aspects has been described based on the embodiments; however, the present disclosure is not limited to these embodiments. Modifications of the embodiments that those skilled in the art can conceive of and forms that can be configured by combining constituent elements in different embodiments may also fall within the scope of one or more aspects unless these modifications and forms deviate from the spirit of the present disclosure.

INDUSTRIAL APPLICABILITY

The present disclosure is applicable to PWM motor drive devices.

REFERENCE MARKS IN THE DRAWINGS

C1 time counter
C2 register
C3 zone setting circuit
C4 zone correction circuit
C5 frequency dividing circuit
C6 PWM zone setting circuit
C7 duty ratio allocation circuit
C8 H-bridge control circuit
C9 duty ratio detection circuit
C10 duty ratio setting circuit
C11 PWM detection circuit
C12 duty ratio/period setting circuit
C13 weighting circuit
C14 variable duty ratio circuit
IM motor current
S1 motor phase signal
S2 motor current phase signal
S3 time count value
S4 register value
S5 zone setting signal
S6 zone correction signal
S7 duty ratio allocation signal
S8 step count value
S9 PWM signal
S10 duty ratio signal
S11 duty ratio setting signal
S12 periodic signal
S13 duty ratio/period setting signal
S14 weighting signal
S15 weighted duty ratio setting signal
CK1, CK2, CK3 clock signal

The invention claimed is:

1. A pulse width modulation (PWM) motor drive device comprising:
    a time counter that counts a time of a polarity of a motor phase signal;
    a register that retains the time;
    a zone setting circuit that splits the time into arbitrary zones, allocates split steps to the arbitrary zones, and generates an arbitrary zone set for which a phase of motor current is corrected;
    a zone correction circuit that compares a motor current phase signal indicating the phase of the motor current with the motor phase signal to correct the zone set;
    a frequency dividing circuit that generates a clock signal to be used in the time counter and the zone setting circuit; and
    an H-bridge control circuit that PWM-drives a motor,
    the zone correction circuit correcting a number of steps in each of the arbitrary zones that has been set from the steps split by the zone setting circuit, and generating a zone correction signal.

2. The PWM motor drive device according to claim 1, wherein
    the zone correction circuit corrects the zone set such that a switching edge of logic of the motor phase signal coincides with a switching edge of logic of the motor current phase signal.

3. The PWM motor drive device according to claim 1, further comprising a duty ratio allocation circuit that arbitrarily sets a PWM duty ratio to each of the zones corrected by the zone correction circuit.

4. The PWM motor drive device according to claim 1, further comprising:
    a duty ratio detection circuit that detects a duty ratio of an input PWM signal; and
    a duty ratio setting circuit that arbitrarily sets a PWM duty ratio to each of the zones corrected by the zone correction circuit, in accordance with the duty ratio detected by the duty ratio detection circuit.

5. The PWM motor drive device according to claim 1, further comprising:
    a PWM detection circuit that detects a duty ratio and period of an input PWM signal; and
    a duty ratio/period setting circuit that arbitrarily sets a PWM duty ratio and a period to each of the zones corrected by the zone correction circuit, in accordance with the duty ratio and the period detected by the PWM detection circuit.

6. The PWM motor drive device according to claim 1, further comprising:

a duty ratio detection circuit that detects a duty ratio of an input PWM signal;
a weighting circuit that weights the detected duty ratio; and
a variable duty ratio circuit that sets a PWM duty ratio to each of the zones corrected by the zone correction circuit, in accordance with the duty ratio set by the weighting circuit.

* * * * *